United States Patent Office.

LUKE A. WILDER, OF CHICAGO, ILLINOIS.

Letters Patent No. 103,403, dated May 24, 1870.

IMPROVED ROOFING-COMPOUND.

The Schedule referred to in these Letters Patent and making part of the same.

To all whom it may concern:

Be it known that I, LUKE A. WILDER, of Chicago, in the county of Cook and State of Illinois, have invented a certain Improved Roofing-Cement Compound; and I do hereby declare that the following is a full and exact description of it.

To enable others skilled in the art to make and use the said compound, I will describe one example of compounding and using the same.

The nature of my improvement relates to a composition for roofing-purposes, which may be used upon either wood, stone, metal, paper, or textile fabrics, and is composed of such materials as to make a roof fire and water-proof, and of a very durable character.

This cement is composed of the following materials or their equivalents, and compounded as hereinafter specified, viz:

| | |
|---|---|
| Oxide of iron, pounds | 85 |
| Bolted soap-stone dust, pounds | 85 |
| Water-lime, pounds | 40 |
| Air-slaked lime, pounds | 40 |
| Total | 250 |

These materials, or equivalents, are all first mixed up together, so as to be well combined, which I denominate the first compound, to which is then added a second compound, composed of 375 pounds of asphaltum of tar, and from 30 to 40 pounds of carbolic acid, or their equivalents, depending upon the temperature the atmosphere, and the consistency of the asphaltum at the time that the compound is being made. The whole mass is then stirred, so as to intimately combine all the ingredients before named.

The first compound, after being prepared, is then mixed with the second, after the latter is melted by heat until it attains about 212° Fahrenheit. The two compounds are then intimately combined by stirring well the whole mass, which forms a paste about the consistency of ordinary mortar, and is then applied to the roof, of any proper material, by appropriate tools or instruments.

This cement roofing, when prepared for transportation, is made up of two packages, one consisting of the first compound, and the other of the second, and the two being combined, as before stated, previous to its being used, for the purpose set forth.

In a short time after the cement is applied, it becomes hard, forming a compact and durable coating, which is fire and water-proof.

Claim.

What I claim as my improvement, and desire to secure by Letters Patent, is—

The roofing-cement composed of the ingredients described, and combined as specified.

L. A. WILDER.

Witnesses:
EDWARD EVERS,
R. W. DUNSTAN.